United States Patent [19]

Jagersberger

[11] 3,972,214
[45] Aug. 3, 1976

[54] MACHINE FOR MANUFACTURING WIRE COILS
[75] Inventor: Adolf Jagersberger, Salzburg, Austria
[73] Assignee: Bleckmann & Co., Salzburg, Austria
[22] Filed: June 2, 1975
[21] Appl. No.: 583,058

[52] U.S. Cl. .................................. 72/132; 83/369; 83/554; 83/907
[51] Int. Cl.² .......................................... B21F 11/00
[58] Field of Search ............. 72/132; 140/71.5, 140; 83/355, 369, 554, 907

[56] References Cited
UNITED STATES PATENTS

| 2,869,640 | 1/1959 | Platt | 83/554 |
| 3,370,495 | 2/1968 | Platt | 83/554 |
| 3,513,741 | 5/1970 | Shallenberg | 83/369 |
| 3,783,726 | 1/1974 | Marks | 83/355 |
| 3,814,145 | 6/1974 | Gott et al. | 140/112 |

Primary Examiner—Lowell A. Larson
Attorney, Agent, or Firm—Kurt Kelman

[57] ABSTRACT

In a machine for manufacturing wire coils, wire is fed by a feeder and is shaped in a winding station to form a continuous helix the convolutions of which may adjoin each other or may be spaced predetermined distances apart. This continuous helix is cut by cutting means into wire coils having a predetermined length or number of convolutions. These coils may constitute springs or may preferably constitute electric resistance heating coils. To control the length of the wire coils, a sensing wheel is associated with the winding station and is driven by the wire and operates control means for controlling the cutting means in such a manner that the length of each severed coil is determined by the preset, measured wire length. To ensure an exact length measurement, the control device comprises a pulse generator, which is operated by the sensing wheel and produces pulses in dependence on the angular movement of the wheel, and a presettable counter for counting these pulses and for initiating the operation of the cutting means when a preset number of pulses have been counted.

6 Claims, 1 Drawing Figure

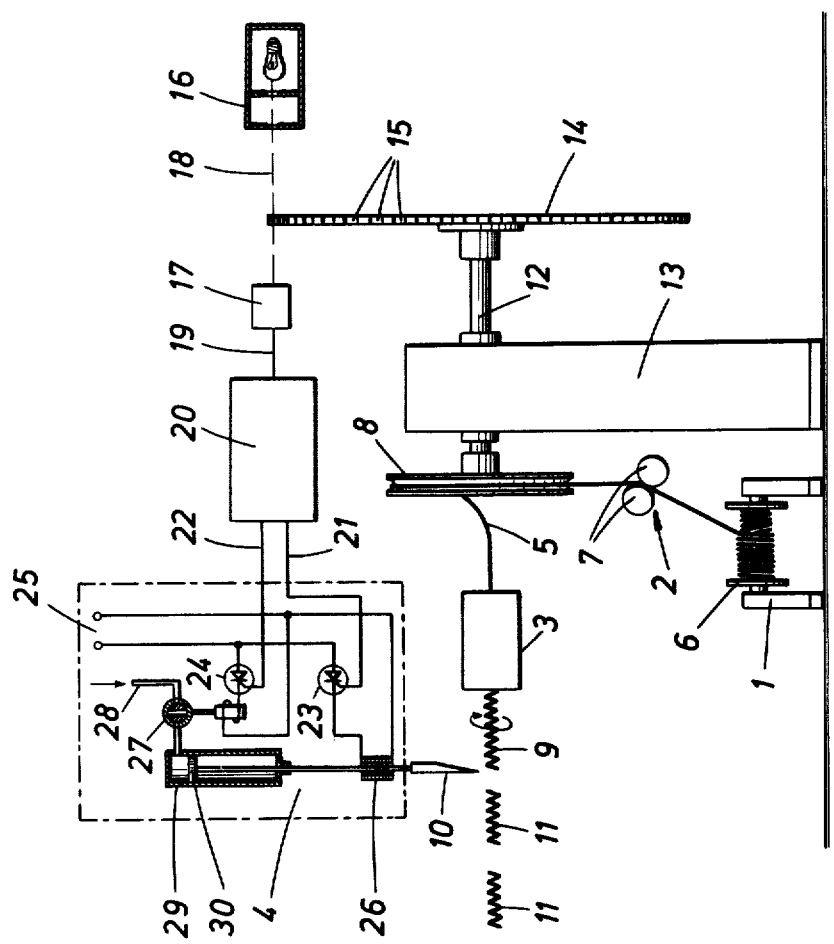

MACHINE FOR MANUFACTURING WIRE COILS

BACKGROUND OF THE INVENTION

Special machines, known as automatic coil-making machines, are known for the manufacture of wire coils, which are used as coil springs and particularly as electric resistance heating coils, and are made from wire in various thicknesses, qualities, with various numbers of convolutions and in various diameters. In these machines, the wire is fed by a feeder to a winding station, in which the wire is shaped to form a continuous helix. The winding station is succeeded by cutting means, which cut wire coils having a predetermined length from the continuous helix. The winding station is preceded by a sensing wheel, which serves to control the length of the wire coils. The wire runs over the sensing wheel to rotate the same in dependence on the length of the wire which is to be processed so that a predetermined angular movement of the sensing wheel corresponds to a certain length of wire. The angular movement of the sensing wheel may be utilized to control the cutting means and the latter may be adjusted to cut off a coil which has been formed from a predetermined length of wire. In practice, the overall length of wire from the point where the wire leaves the sensing wheel to the point where the cutting tool engages the helix is constant so that the points at which the sensing wheel contacts the wire being fed and the point at which the helix is acted upon by the cutting means may be freely selected.

Difficulties are encountered in a known machine of this kind because the continuous wire helix cannot be cut through with the accuracy which is required. One of these difficulties resides in that the preselected wire length which is to be measured to initiate the cutting of the helix cannot be exactly controlled. In the known machine, the control means for the cutting means comprise a camwheel, which is driven by the sensing wheel through the intermediary of an adjustable friction wheel transmission and which actuates two microswitches. One of these two microswitches delivers a control pulse which causes the cutting knife of the cutting means to descend to such an extent that is slides in between two successive convolutions of the helix. The closing of the second microswitch results in the renewed energization of a solenoid which controls the knife or other cutting tool of the cutting means so that the knife is operated to chop through the helical wire.

The friction wheel transmission has a certain slip so that even without a change of the setting of this transmission, different lengths of wire, corresponding to different lengths of the helix, may pass through during successive measurements until the operation is due to the fact that the microswitches are actuated by a camwheel acting on a contact spring and that this actuation cannot be accurately performed and is not always accomplished when the contact spring engages the same point of the camwheel. These circumstances result in considerable length tolerances of the coils. As a result, springs may be unusable for the intended purpose and the resistance of resistance heating coils cannot be exactly controlled, so that there is a considerable percentage of rejects having an excessively low or high mat output.

In the machine which has been described, the continuous helix which leaves the winding station rotates at a speed which corresponds to the winding speed and which is often relatively high, in a range of, e.g., 500–5000 r.p.m. The number of cycles to be performed by the cutting means per unit of time depends on the winding speed and on the selected length of each wire coil. In an operation involving relatively thin wires, short wire coils, and high winding speeds, the time between two successive cutting steps may be less than 1 second. During this short interval of time, the knife must be lowered into the helix, the cut must be performed, and the knife must be returned to its initial position. To avoid an upsetting of the helix, a knife may be used which is moved also in the direction in which the helix advances while the knife is moved between the position in which it initially engages the helix and the position in which it cuts through the helix, which is moved, e.g., along an arc of a circle. As has been described hereinbefore, the cutting time cannot be exactly controlled in dependence on length in the known machines, as has been described hereinbefore. In addition to the disadvantages mentioned above, this inaccuracy has the result in practice that in numerous severed wire coils the wire convolution at which they have been severed has been bent over the opening of the coil. A neatly cut off end of the coil is essential for the further processing of the coil, e.g., in the manufacture of tubular heaters. In the manufacture of tubular heaters, a terminal bolt is inserted into the opening of the coil and is then welded to the coil. A coil having a distorted end portion, as described above, cannot be used and the bent wire end protruding over the opening of the coil must be pinched off by hand before the coil can be processed further. In practice, a plurality of auxiliary workers must work in association with each automatic winding apparatus for the single purpose of inspecting the coils for neatly cut off ends and of pinching off any bent wire portions at such ends. As has been mentioned, the main cause for the bending of the wire portion at the end of the coil is the inaccurate length control, which has the result that during its initial descent, which precedes the actual cut, the knife does not enter between two wire convolutions but bends the wire. If the knife descends too soon, the rotating helix will act on the knife for a relatively long time and may thus cause the knife to vibrate. If the knife descends too late, it will not enter the space between successive convolutions.

For this reason it is an object of the invention to eliminate these disadvantages and to provide a machine which enables an exact setting of selected coil lengths and a manufacture of coils in lengths which deviate only very slightly from the set value.

SUMMARY OF THE INVENTION

The invention resides substantially in that in a machine of the kind defined the control means comprise a pulse generator, which is operated by the sensing wheel to produce pulses in dependence on the angular movement of the sensing wheel, and a presettable counter for counting these pulses, which counter initiates the operation of the cutting means with a time delay which is as small as possible.

In practice, the setting may be accomplished with simple means in such a manner that each pulse corresponds to only a very small length unit so that the high accuracy with which the counting operation can easily be accomplished ensures for the length measurement an accuracy which is fully sufficient for the stated purpose so that the point where each wire coil is cut from the continuous helix can be exactly controlled.

Although various types of pulse generators may be used for the purposes of the invention, in a preferred embodiment the pulse generator comprises a transmitter for emitting a light beam, a receiver for receiving said light beam, and a disk which is driven by the sensing wheel and near its periphery is provided with means which interrupt the light beam during the rotation of the disk, so that the receiver which is connected in an electric circuit delivers pulses in step with the interruption of the light beam.

SHORT DESCRIPTION OF THE DRAWING

The subject matter of the invention is substantially diagrammatically shown on the drawing, in which only the means for controlling the length of the wire coil and the means for driving the cutting means are shown in more detail. The other essential parts of the machine have been shown in block form. Parts which are not essential for the invention, such as drive means, guides, machine frame members, and the like, have been omitted for the sake of clearness.

DESCRIPTION OF THE PREFERRED EMBODIMENT

A common machine frame carries an uncoiling station 1, a straightening station 2, a winding station 3, and a cutting station 4, which are arranged in succession. Stations 1 to 3 may be designed as in the commercially available machines. A machine of this type is known under the trade name "Kanthal" and is sold by a Swedish company as "Kanthal-Oakley Coil-winding Machine."

In the uncoiling station 1, wire 5 is withdrawn from a supply coil 6. To ensure a uniform initial tension and to straighten the wire, the same is repeatedly trained in a straightening station 2 around rollers and the like 7 and passed between snubbers and the like and is finally trained around a sensing wheel 8 so that the latter rotates at a peripheral velocity which corresponds to the travel of the wire 5. From the sensing wheel 8 the wire 5 enters the winding station 3, in which it is wound to form a continuous helix 9, which has a predetermined diameter and a predetermined pitch. These parameters can be adjusted in each case. The continuous helix 9 rotates as it leaves the winding station 3. In the cutting station 4, a cutting tool 10, in the present embodiment a knife, is adapted to descend into the helix 9 in two steps. In the first step, the knife should only enter between two adjacent convolutions of the helix 9, which convolutions may have been separated in that the helix has been kinked or bent. Alternatively, the knife may force the adjacent convolutions apart. In the second step, the knife should cut through the helical wire so that wire coils 11 having an exactly predetermined length are cut from the continuous helix 9. Particularly with heating coils, the length of wire of each coil 11 must be exactly controlled.

The sensing wheel 8 is mounted on a shaft 12, which is mounted in a bearing bracket 13 and on which a disk 14 is mounted. Alternatively, the sensing wheel 8 and disk 14 might be operatively connected by a step-up transmission, which should be free of slippage as far as possible. The disk 14 is provided at its periphery with teeth 15, which during the rotation of the disc 14 successively interrupt a light beam 18, which is emitted by a light source 16 and received by a light-sensitive receiver 17. In a preferred embodiment, the disk 14 has an outside diameter of 420 mm and carries 520 teeth. The sensing wheel 8 is 300 mm in diameter and the groove has such a depth that a wire convolution which completely surrounds the wheel 8 in its groove would have a length of 885 mm. This means that 885 mm wire have moved over the wheel 8 when the same has performed one revolution. Depending on the design and circuitry of the light-sensitive receiver 17, which may comprise a photoconductor or a photo-electric cell, each interruption or passage of the light beam 18 will cause the receiver 18 to generate an electric pulse, which is delivered in a lead 19 to a counter 20. In this arrangement, each pulse indicates that wire in a length of 1.7 mm has moved over the sensing wheel 8.

The counter 20 is presettable so that it operates as a presettable memory, which delivers two control pulses through leads 21 and 22, respectively, when the counter has counted to one and the other of two presettable counts, respectively. The delivery of the control pulse and the initiation of the operation of the means controlled by this control pulse should be accomplished virtually without a time delay. In the present embodiment the counter 20 generates only a weak output signal, which cannot be used directly for the control. To minimize the time delay, the counter is provided with two reed relays, which are not shown and which are connected to a separate power source. Each of these reed relays is caused to operate by the output of the counter when an associated count has been reached. When one of the reed relays has operated, it delivers a control pulse to the associated leads 21 or 22.

Thyristors 23 and 24 are controlled via leads 21 and 22, respectively. These thyristors are connected to a power supply circuit 25.

Upon receipt of the control pulse via lead 21, the thyristor 23 is fired virtually without a time delay to energize a solenoid 26, which causes the knife 10 to descend into the continuous helix 9 until the knife edge of the knife has just penetrated between two successive convolutions of the coil. As soon as the counter has counted to the second preset count so that the second control pulse is delivered via lead 22, the thyristor 24 is also fired virtually without a time delay to energize the solenoid of a solenoid valve 27, which is incorporated in a compressed-air supply conduit 28 and which in response to the energization of its solenoid causes compressed air to be supplied to a cylinder 29, which contains a piston 30 that is operatively connected to the knife 10. At the time when the thyristor 24 is fired, the piston 30 moves virtually without a time delay the knife 10 to another position and causes the knife to chop through the helix 9. When the cut has been performed, resetting means, not shown, are operated to restore the knife 10 to its initial position and to deenergize the solenoids 26, 27 and thyristors 23, 24.

The second count to which the counter is preset determines the exact length of each coil 11. The first count to which the counter 20 is set determines the interval of time from the completion of the first step of the knife 10 to the cutting step thereof. These two counts may be set with high accuracy.

What I claim is:

1. A machine for manufacturing wire coils, which comprises
    1. feeding means for delivering wire, 2. winding means for receiving said wire from said feeding means and for forming said wire into a continuous helix,
3. a sensing wheel arranged to contact the wire between said feeding means and said winding means and to perform an angular movement corresponding to the advance of said wire in contact with said sensing wheel,
4. cutting means operable to cut wire coils from said helix, said cutting means comprising
    a. a cutting tool and tool-driving means operable to move said cutting tool in a first step from an initial position in which said cutting tool is spaced from said helix to an intermediate position in which said cutting tool is disposed between two adjacent convolutions of said helix, and in a second step from said intermediate position to a final position so as to cut through the helix, the tool-driving means including a first solenoid energizable to move said cutting tool through said first step and a pneumatic actuator operable to move said cutting tool through said second step, and
5. control means for controlling the operation of said cutting means in response to the angular movement of said sensing wheel so as to cause said cutting means to cut wire coils having a predetermined length from said helix, said control means comprising
    a. a pulse generator for producing pulses in response to the angular movement of said sensing wheel,
    b. a presettable counter adapted to be preset to first and second counts for counting said pulses, and
    c. final control means for initiating the operation of said cutting means when said counter has counted to a preset count and arranged to cause said tool-driving means to move said cutting tool through said first step when said counter has counted to said first count and subsequently through said second step when said counter has subsequently counted to said second count, said final control means including a first thyristor arranged to be fired immediately when said counter has counted to said first count, a second thyristor arranged to be fired immediately when said counter has counted to said second count, said first solenoid being arranged to be energized in immediate response to the firing of said first thyristor, a second solenoid arranged to be energized in immediate response to the firing of said second thyristor, and a valve arranged to admit compressed air to said pneumatic actuator to operate the same in immediate response to the energization of said second solenoid.

2. A machine as set forth in claim 1, in which
said final control means further includes a first reed relay arranged to be energized immediately when said counter has counted to said first count, and a second reed relay arranged to be energized immediately when said counter has counted to said second count,
said first thyristor being arranged to be fired in immediate response to the energization of said second reed relay.

3. A machine as set forth in claim 1, in which said pulse generator comprises
    a transmitter for emitting a light beam,
    a light-sensitive receiver for receiving said light beam,
    a rotary disk connected to said sensing wheel for rotation therewith and having a peripheral portion which extends into the path of said light beam and is adapted to intermittently interrupt said light beam during a rotation of said disk, and
    a pulse-generating electric circuit which includes said receiver and is operable to generate pulses under control of the reception of said light beam by said receiver.

4. A machine as set forth in claim 3, in which said peripheral portion comprises peripherally spaced open portions adapted to permit the passage of said light beam through said disk and lands disposed between adjacent open portions and adapted to interrupt said light beam.

5. A machine as set forth in claim 4, in which said lands consist of teeth.

6. A machine as set forth in claim 4, in which said open portions consist of holes.

* * * * *